(12) United States Patent
Hwang

(10) Patent No.: US 11,329,828 B2
(45) Date of Patent: May 10, 2022

(54) VERIFICATION SYSTEM AND METHOD FOR CHAINING DATA

(71) Applicant: International Trust Machines Corporation, New Taipei (TW)

(72) Inventor: Gwan-Hwan Hwang, New Taipei (TW)

(73) Assignee: International Trust Machines Corporation, New Taipei (TW)

( * ) Notice: Subject to any disclaimer, the term of this patent is extended or adjusted under 35 U.S.C. 154(b) by 378 days.

(21) Appl. No.: 16/655,594

(22) Filed: Oct. 17, 2019

(65) Prior Publication Data

US 2020/0344061 A1 Oct. 29, 2020

(30) Foreign Application Priority Data

Apr. 24, 2019 (TW) .................................. 108114389

(51) Int. Cl.
*H04L 29/06* (2006.01)
*H04L 9/32* (2006.01)
(Continued)

(52) U.S. Cl.
CPC ........ *H04L 9/3236* (2013.01); *G06F 16/2246* (2019.01); *H04L 9/0637* (2013.01); *H04L 63/20* (2013.01); *H04L 2209/38* (2013.01)

(58) Field of Classification Search
CPC ..... H04L 9/3236; H04L 9/0637; H04L 63/20; H04L 2209/38; G06F 16/2246
(Continued)

(56) References Cited

U.S. PATENT DOCUMENTS

2012/0143830 A1* 6/2012 Cormode .......... G06F 16/24568
707/687
2013/0276058 A1 10/2013 Buldas et al.
(Continued)

FOREIGN PATENT DOCUMENTS

CN 108230109 A 6/2018
JP 2019-051612 A 1/2019
(Continued)

OTHER PUBLICATIONS

Hwang Gwan-Hwan et al.: "InfiniteChain: A Multi-chain Architecture with Distributed Auditing of Sidechains for Public Blockchains", Jun. 22, 2018 (Jun. 22, 2018), Annual International Conference on the Theory and Applications of Cryptographic Techniques, Eurocrypt 2018; [Lecture Notes in Computer Science; Letc. Notes Computer], Springer, Berlin, Heidelberg, pp. 47-60, XP047476573, ISBN: 978-3-642-17318-9; [retrieved on Jun. 22, 2018]; section 2; figures 3, 4, 5.

*Primary Examiner* — Longbit Chai
(74) *Attorney, Agent, or Firm* — ScienBiziP, P.C.

(57) ABSTRACT

A verification system and method for chaining data are provided. The system includes a security protocol device, a blockchain device, and a database device. The security protocol device receives record data and integrates the record data into binary trees. Each binary tree includes a root and leaf nodes. The security protocol device transmits root hashes of the roots to the blockchain device at a blockchain. The blockchain device includes a chain data string including data sets chained in a series manner. Each data set includes a root hash and a corresponding chain hash. The chain hash of each data set is related to the root hash and the chain hash of the previous data set. The chain hash of the first data set is related to an initial chain hash. The security protocol
(Continued)

device stores the binary trees and the initial chain hash to an off-chain database device.

20 Claims, 9 Drawing Sheets

(51) Int. Cl.
*G06F 16/22* (2019.01)
*H04L 9/06* (2006.01)

(58) Field of Classification Search
USPC .......................................................... 380/42
See application file for complete search history.

(56) References Cited

U.S. PATENT DOCUMENTS

| 2015/0180971 | A1 | 6/2015 | Varney et al. |
| 2018/0101701 | A1* | 4/2018 | Barinov .................. H04L 63/12 |
| 2018/0189312 | A1 | 7/2018 | Alas et al. |
| 2018/0198626 | A1 | 7/2018 | Kroonmaa et al. |

FOREIGN PATENT DOCUMENTS

| TW | 201535146 A | 9/2015 |
| TW | 201732666 A | 9/2017 |
| WO | 2018119293 A1 | 6/2018 |

* cited by examiner

VERIFICATION SYSTEM AND METHOD FOR CHAINING DATA

CROSS-REFERENCE TO RELATED APPLICATION

This non-provisional application claims priority under 35 U.S.C. § 119(a) to Patent Application No. 108114389 filed in Taiwan, R.O.C. on Apr. 24, 2019, the entire contents of which are hereby incorporated by reference.

BACKGROUND

Technical Field

The present invention relates to a verification system, and in particular, to a verification system and method that can cooperate with a blockchain and be used for chaining data.

Related Art

In the prior art, a blockchain adopts a distributed architecture to achieve decentralization. Terminal computers of the world can be connected by blockchains. Data transmitted by any terminal computer to a blockchain can be distributed to other terminal computers on the blockchain through a specific operation mode. Since these data are stored in a large number of terminal computers on the blockchain, the correctness of the data can be mutually verified by the large number of terminal computers on the blockchain, which makes the blockchain data difficult to be altered or tampered with.

In the traditional terminal centralized architecture, when a terminal computer needs to upload data to a server or download data from a server, this task involves only the operation of limited devices such as the terminal computer, a central server, and a network server between the two. This task can be performed extremely quickly in terms of the current network speed and computer computing power. However, in the blockchain architecture, when a terminal computer needs to upload data to a blockchain or download data from a blockchain, based on the characteristics of the blockchain, this task involves verification procedures of a large number of other terminal computers (such as miners) on the blockchain. Consequently, huge network transmission requirements and operation amount are incurred, which is relatively time-consuming and high in operation costs (such as fees for miners).

In general, a blockchain is a tree-like data structure that uses a binary tree or a Merkle tree. All data are hashed to generate hash values. The binary tree includes a root at the top layer and a plurality of leaf nodes at the bottom layer. A hash value of each datum is stored in the leaf node, and the hash values of all leaf nodes are layer-by-layer operated to generate a root hash at the root of the tree. All binary trees are stored in terminal computers on the blockchain. To verify the correctness of a datum in a binary tree, the correctness of the binary tree and the datum thereof can be verified by comparing root hashes of the binary tree on the terminal computers.

SUMMARY

Based on the existing blockchain, when a large number of data on the blockchain are read, loads are caused on a terminal computer on the blockchain, and the efficiency is not good. In addition, if the operation of reading the large number of data is regarded as a malicious behavior by the terminal computer on the blockchain, the read request is blocked by the terminal computer on the blockchain, and the data cannot be read; and even worse, a network address that issues the read request is blacklisted by the terminal computer on the blockchain, and the blockchain can no longer be accessed by the terminal computer.

In view of this, the present invention provides a verification system and method for chaining data, to resolve the problem of inefficiency caused by reading a large number of data on a blockchain, and resolve the problem of huge network transmission requirements and operation loads of the blockchain caused by a large number of readings.

An embodiment of the present invention provides a verification system that is suitable for cooperating with a blockchain and chaining data. The verification system includes a security protocol device, a blockchain device, and a database device. The security protocol device receives a plurality of record data and integrates the record data into a plurality of binary trees according to a hash function. Each binary tree includes a root and a plurality of leaf nodes. Each of the roots stores a root hash, and the hash values of the record data are respectively stored in the leaf nodes. The blockchain device is located at the blockchain and communicates with the security protocol device. The security protocol device transmits the root hashes of the binary trees to the blockchain device. The blockchain device includes at least one chain data string. The chain data string includes a plurality of data sets chained in a series manner. Each data set includes a respective one of the root hashes and a corresponding chain hash. The chain hash of each data set is related to the root hash and the chain hash of the previous data set. The chain hash of the first data set is related to an initial chain hash. The database device communicates with the security protocol device in an off-chain manner not involved in the blockchain. The security protocol device stores the binary trees and the initial chain hash to the database device.

An embodiment of the present invention provides a verification method that is suitable for cooperating with a blockchain. The verification method includes: receiving a plurality of record data in an off-chain manner not involved in the blockchain; integrating the record data into a plurality of binary trees according to a hash function, where each binary tree includes a root and a plurality of leaf nodes, each of the roots stores a root hash, and the hash values of the record data are respectively stored in the leaf nodes; transmitting the root hashes of the binary trees to the blockchain, where at least one chain data string is set on the blockchain, the chain data string includes a plurality of data sets chained in a series manner, each data set includes a respective one of the root hashes and a corresponding chain hash, the chain hash of each data set is related to the root hash and the chain hash of the previous data set, and the chain hash of the first data set is related to an initial chain hash; and storing the binary trees and the initial chain hash in the off-chain manner not involved in the blockchain.

In summary, by means of the verification system and method according to the embodiments of the present invention, when a large number of root hashes of binary trees need to be read, the root hashes can be read through an off-chain database device, and the correctness of the root hashes read in an off-chain manner is verified by using a chain hash of a latter data set of a chain data string on a blockchain. Therefore, under the premise of maintaining the credibility of the data, the network transmission requirements and operation loads of the blockchain are alleviated.

The detailed features and advantages of the present invention are described in detail below in the implementations. The content is sufficient for those skilled in the art to understand the technical content of the present invention and implement it accordingly. The related objectives and advantages of the present invention can be easily understood by those skilled in the art according to the content, the claims, and the drawings disclosed in the specification.

BRIEF DESCRIPTION OF THE DRAWINGS

FIG. 3a is a schematic diagram II of a chain data string according to an embodiment of the present invention;

DETAILED DESCRIPTION

Figure 1:
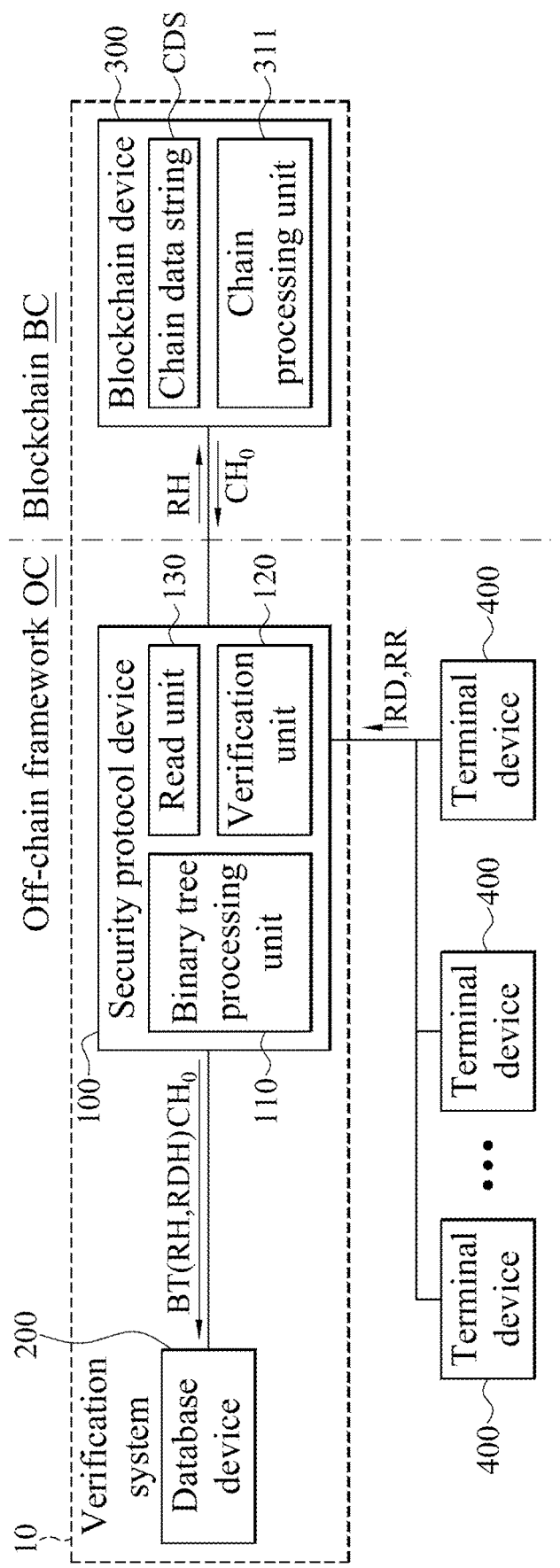
FIG. 1 is a schematic block diagram of a verification system according to an embodiment of the present invention.

Referring to FIG. 1, FIG. 1 is a schematic block diagram of a verification system 10 according to an embodiment of the present invention. In this embodiment, the verification system 10 is suitable for cooperating with a blockchain BC. The blockchain BC may include a public blockchain, a private blockchain, or a combination thereof. The verification system 10 is configured to communicate with a plurality of terminal devices 400 in an off-chain manner e.g. via an off-chain framework OC consisted of, for example, one or more off-chain devices and/or one or more off-chain channels not involved in the blockchain BC, and cooperates with the off-chain framework OC and the blockchain BC. Each terminal device 400 can generate at least one record data RD. The off-chain framework OC refers to a path that is independent of the blockchain BC, that is, a path that is not involved in the blockchain BC. The off-chain framework OC communication refers to a communication relationship on a path independent of the blockchain BC, i.e. establishment of communication through a path not involved in the blockchain BC. For example, communication between two devices via an off-chain framework OC means that the two devices can be directly connected and transmit signals to each other through networks without involving the blockchain BC. The terminal device 400 is, for example, a desktop computer, a notebook computer, or various sensors. The record data RD is, for example, a file or transaction information generated by a desktop computer or a notebook computer, or numerical information sensed by a sensor, but is not limited thereto.

As shown in FIG. 1, in this embodiment, the verification system 10 includes a security protocol device 100, a database device 200, and a blockchain device 300. The security protocol device 100 communicates with the database device 200 via the off-chain framework OC not involved in the blockchain BC, and the security protocol device 100 communicates with the blockchain device 300 located on the blockchain BC. The database device 200 is, for example, a data storage server independent of the blockchain BC, and the blockchain device 300 is, for example, a collection of a plurality of computers connected to the blockchain BC, but is not limited thereto. In this embodiment, the security protocol device 100 is a server that combines communication capabilities of the blockchain BC and the off-chain framework OC. For example, the security protocol device 100 is an intermediary between the off-chain framework OC and the blockchain BC, and can serve as a bridge between the terminal device 400 and the database device 200 as well as the blockchain device 300, which will be detailed later.

Figure 2:
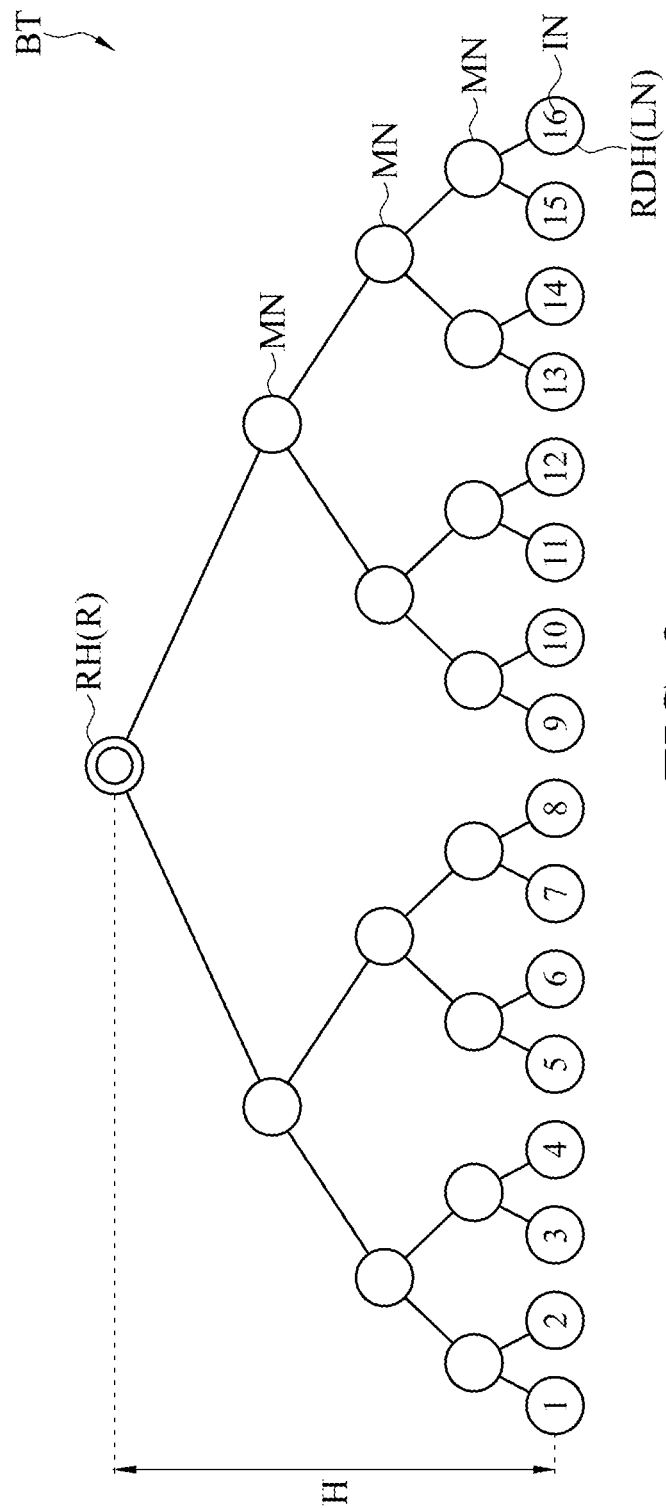
FIG. 2 is a schematic diagram of a binary tree according to an embodiment of the present invention.

Referring to FIG. 2, FIG. 2 is a schematic diagram of a binary tree BT according to an embodiment of the present invention. As shown in FIG. 1 and FIG. 2, in this embodiment, after each terminal device 400 generates the record data RD, each terminal device 400 transmits the record data RD to the security protocol device 100 via the off-chain framework OC. After the security protocol device 100 receives the record data RD of each terminal device 400 via the off-chain framework OC, the security protocol device 100 integrates the record data RD into at least one binary tree BT according to a hash function.

As shown in FIG. 2, in this embodiment, the binary tree BT includes a root R, a plurality of middle nodes MN, and a plurality of leaf nodes LN. In the tree data structure of the binary tree BT, the root R is located at the top layer, the leaf nodes LN are located at the bottom layer, and the middle nodes MN are distributed at one or more layers between the top layer and the bottom layer. Every two adjacent leaf nodes LN integrate at an upper layer and become a middle node MN. Every two adjacent middle nodes MN at each layer integrate at an upper layer and become a middle node MN. Two middle nodes MN at the topmost layer integrate and become the root R. Each leaf node LN stores the respective one of the hash values RDH of the record data RD. A hash value of each middle node MN and a root hash RH in the root R are related to the hash values RDH of the record data RD.

For example, the security protocol device 100 may use the SHA-256 hash function to hash the record data RD to generate corresponding hash values RDH, and the security protocol device 100 respectively stores the hash values RDH of the record data RD to the respective leaf nodes LN. Moreover, the two hash values stored in each set of two adjacent leaf nodes LN are connected and then hashed and stored in the middle node MN at the upper layer, the two hash values stored in each set of two adjacent middle nodes MN at each layer are connected and then hashed and stored in the middle node MN at the upper layer, and so on. In this embodiment, the two hash values may be connected and then hashed in a manner that the two hash values are first connected into a string of code and then the string of code is hashed, but not limited thereto. For example, if the first hash value is "xxx", and the second hash value is "ooo", the two hash values are first connected as a string of code of "xxxooo", and the string code "xxxooo" will be hashed again to generate a hash value. Finally, the two hash values stored in the two middle nodes MN at the topmost layer are connected and hashed to generate a root hash RH. In other words, the binary tree BT includes the hash values RDH of the record data RD stored in the leaf nodes LN and the root hash RH stored in the root R. Moreover, the record data RD cannot be tampered with. This is because as long as any record datum RD in the binary tree BT has been tampered with, the hash value RDH of the record datum RD will change. As long as the hash value RDH of the record datum RD of any leaf node LN changes, the root hash RH of the binary tree BT also changes accordingly. By judging whether the root hash RH changes, the correctness of the record data RD corresponding to the binary tree BT can be verified. In different embodiments, a single leaf node LN may also store the hash values RDH of two or more record data RD. In this case, the hash values RDH stored in the leaf node LN are values obtained by connecting and hashing the hash values RDH of two or more record data RD.

As shown in FIG. 1 and FIG. 2, in this embodiment, the security protocol device 100 includes a binary tree processing unit 110 and a verification unit 120. The binary tree processing unit 110 and the verification unit 120 are, for example but not limited to, functional modules formed by software/hardware to perform specific functions respectively. The binary tree processing unit 110 and the verification unit 120 may be independent modules or an integrated module.

In this embodiment, the binary tree processing unit 110 of the security protocol device 100 automatically hashes and integrates the received record data RD to generate a binary tree BT. The security protocol device 100 transmits the root hashes RH of the binary trees BT to the blockchain device 300, that is, these root hashes RH will be stored on the blockchain BC. In addition, the security protocol device 100 stores the binary trees BT in the database device 200. That is, the complete binary tree BT is stored via the off-chain framework OC, instead of being stored on the blockchain BC. In other embodiments, the complete binary tree BT may also be stored in the database device 200 and transmitted to the blockchain device 300.

In this embodiment, the verification unit 120 of the security protocol device 100 verifies the correctness of the binary tree BT stored in the database device 200. When the security protocol device 100 receives a verification request, and the verification request is to verify the correctness of a certain record datum RD, the verification unit 120 automatically compares the root hash RH of the binary tree BT corresponding to the record datum RD on the blockchain device 300 with the root hash RH of the binary tree BT corresponding to the record datum RD stored in the database device 200, so as to verify the correctness of the binary tree BT stored in the database device 200. If the root hash RH on the blockchain device 300 is consistent with the root hash RH of the binary tree BT stored in the database device 200, based on the characteristics of the blockchain BC, it indicates that the binary tree BT of the record datum RD stored in the database device 200 is correct.

Since the complete binary tree BT is located in the database device 200 via the off-chain framework OC, the access and operation of the hash values RDH of the record data RD are mainly performed via the off-chain framework OC, and the network transmission requirements, operation amount, operation time, and operation costs for this task which is traditionally performed on the blockchain BC can be saved. Moreover, the root hash RH of the binary tree BT in the database device 200 can be verified by comparing with the corresponding root hashes RH on the blockchain device 300, and the correctness of the data in the database device 200 via the off-chain framework OC can be ensured.

Figure 3:
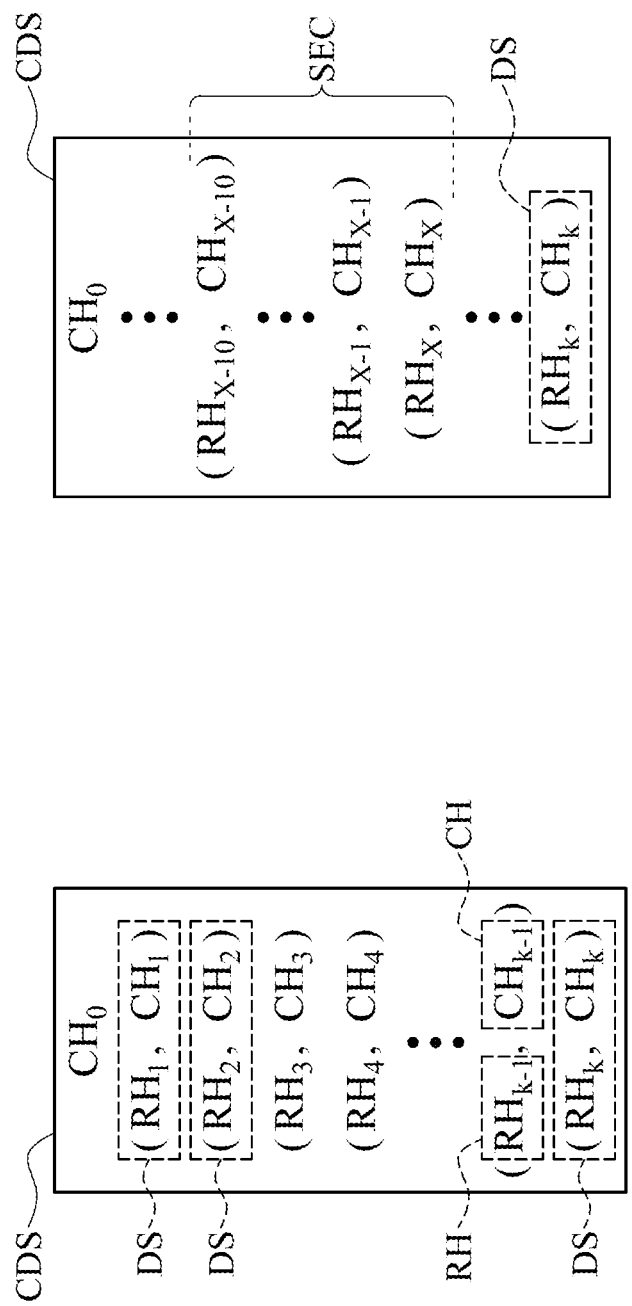
FIG. 3 is a schematic diagram I of a chain data string according to an embodiment of the present invention.

Referring to FIG. 3, FIG. 3 is a schematic diagram I of a chain data string CDS according to an embodiment of the present invention. As shown in FIG. 1 and FIG. 3, in this embodiment, the blockchain device 300 includes at least one chain data string CDS, and the chain data string CDS includes a plurality of data sets DS chained in a series manner. The series manner means from the first datum, the second datum, and the third datum sequentially to the last but one datum and the last datum, and each datum is related to the previous datum. For example, the second datum is related to the first datum, the third datum is related to the second datum, the last datum is related to the last but one datum, and so on. In this embodiment, each data set DS includes a respective root hash RH and a corresponding chain hash CH. The chain hash CH of each data set DS is related to the root hash RH and the chain hash CH of the previous data set DS. The chain hash CH of the first data set DS is related to an initial chain hash $CH_0$.

As shown in FIG. 1, in this embodiment, the blockchain device 300 includes a chain processing unit 311, and the chain processing unit 311 is configured to generate the chain data string CDS. As shown in FIG. 1 and FIG. 3, in this embodiment, after the blockchain device 300 receives root hashes RH of a plurality of binary trees BT, the chain processing unit 311 sequentially generates data sets DS according to the generating or receiving time of the root hashes RH of the received binary trees BT. The chain hash CH of each data set DS is generated by hashing the previous data set DS. The chain hash CH of the first data set DS is generated by hashing the initial chain hash $CH_0$.

In this embodiment, the chain processing unit 311 can first generate the initial chain hash $CH_0$. The initial chain hash $CH_0$ can be any value or a combination of any letter or number. Moreover, the chain processing unit 311 generates a plurality of data sets DS chained in a series manner in the chain data string CDS according to the following two formulas:

$$CH_i = hash(RH_{i-1}|CH_{i-1});\ \text{and}$$

$$CH_1 = hash(CH_0).$$

$RH_{i-1}$ is root hash RH, $CH_{i-1}$ is chain hash CH, and i is an integer from 2 to k.

As shown in FIG. 3, the first data set DS has the root hash RH of $RH_1$ and the chain hash CH of $CH_1$, and $CH_1$ is a hash value generated by hashing $CH_0$. The latter (arranged after the first data set DS) second data set DS has the root hash RH of $RH_2$ and the chain hash CH of $CH_2$, and the $CH_2$ is a hash value generated by hashing the connected $RH_1$ and $CH_1$. As described above, hashing of the connected $RH_1$ and $CH_1$ may be implemented by connecting $RH_1$ and $CH_1$ and then performing the hashing, but is not limited thereto. The latter (arranged after the second data set DS) third data set DS has the root hash RH of $RH_3$ and the chain hash CH of $CH_3$, and the $CH_3$ is a hash value generated by hashing the connected $RH_2$ and $CH_2$. The last data set DS has the root hash RH of $RH_k$ and the chain hash CH of $CH_k$, and the $CH_k$ is a hash value generated by hashing the connected $RH_{k-1}$ and $CH_{k-1}$. The root hashes RH and the chain hashes CH of the rest data sets DS are deduced by analogy. Moreover, these data sets DS chained in the series manner form the chain data string CDS. In this embodiment, the security protocol device 100 may store the initial chain hash $CH_0$ to the database device 200, but is not limited thereto.

As shown in FIG. 1 and FIG. 3, in this embodiment, the security protocol device 100 further includes a read unit 130. The read unit 130 is configured to read corresponding data from the blockchain device 300 and the database device 200. The terminal device 400 can transmit a read request RR to the security protocol device 100 to read the root hashes RH of one or more binary trees BT. When the security protocol device 100 receives the read request RR, the read request RR is to read a plurality of root hashes RH, and the plurality of root hashes RH belongs to a plurality of data sets DS of the chain data string CDS, the read unit 130 reads the root hash RH of the latter data set DS of the chain data string CDS from the blockchain device 300, and reads one or more of the root hashes RH of the former data sets DS of the chain data string CDS from the database device 200, and the security protocol device 100 verifies the correctness of the former one or more root hashes RH of the database device 200 by using the chain hash CH of the latter data set DS of the blockchain device 300.

For example, when the security protocol device 100 receives the read request RR, and the read request RR is to read k root hashes RH from $RH_1$ to $RH_k$ of the chain data string CDS as in FIG. 3, the read unit 130 reads the root hash RH and the chain hash CH (i.e. $RH_k$ and $CH_k$) of the last data set DS of the data sets DS of the chain data string CDS from the blockchain device 300. Moreover, the read unit 130 reads the root hashes RH (that is, from $RH_1$ to $RH_{k-1}$) of the former data sets DS from the database device 200; and the verification unit 120 verifies the correctness of $RH_1$ to $RH_{k-1}$ of the former data sets DS of the database device 200 by using $RH_k$ of the last data set DS. The verification unit 120 can use the aforementioned two formulas and the initial chain hash $CH_0$ and $RH_1$ to $RH_{k-1}$ stored in the database device 200 to perform hashing and chaining operation to calculate $CH_k$, and compares the calculated $CH_k$ with $CH_k$ on the blockchain device 300. If the calculated $CH_k$ is consistent with $CH_k$ on the blockchain device 300, it indicates that $RH_1$ to $RH_{k-1}$ stored in the database device 200 are consistent with $RH_1$ to $RH_{k-1}$ on the blockchain device 300. Because it is based on hashing operation, as long as any root hash RH in $RH_1$ to $RH_{k-1}$ stored in the database device 200 is inconsistent with the corresponding root hash RH in $RH_1$ to $RH_{k-1}$ on the blockchain device 300, the calculated $CH_k$ is different from $CH_k$ on the blockchain device 300.

Referring to FIG. 3a, FIG. 3a is a schematic diagram II of a chain data string CDS according to an embodiment of the present invention. The chain data string CDS in FIG. 3a is substantially the same as the chain data string CDS in FIG. 3. However, for ease of description, the chain data string CDS in FIG. 3a shows a data section SEC of a continuous data set DS. As shown in FIG. 3a, in this embodiment, the security protocol device 100 can further read data sets DS of any data section SEC of the chain data string CDS, and performs verification by using the last data set DS of the data section SEC. For example, when the security protocol device 100 receives the read request RR, and the read request RR is to read 11 root hashes RH from $RH_{x-10}$ to $RH_x$ of the data section SEC of the chain data string CDS as in FIG. 3, where x is less than k and greater than or equal to 10, the read unit 130 reads the root hash RH and the chain hash CH ($RH_x$ and $CH_x$) of the last data set DS of the data sets DS of the data section SEC from the blockchain device 300, and the read unit 130 reads the root hashes RH (i.e. from $RH_{x-10}$ to $RH_{x-1}$) of the former data sets DS of the data section SEC from the database device 200. Moreover, the verification unit 120 verifies the correctness of $RH_{x-10}$ to $RH_{x-1}$ of the former data sets DS of the data section SEC of the database device 200 by using $RH_x$ of the last data set DS of the data section SEC.

In some embodiment, the initial chain hash $CH_0$ may not be stored in the database device 200. Instead, when the security protocol device 100 receives the read request RR, the read unit 130 reads the initial chain hash $CH_0$ of the chain data string CDS and the root hash RH of the latter data set DS of the data sets DS from the blockchain device 300, and reads one or more of the root hashes RH of the former data sets DS of the chain data string CDS from the database device 200.

Figure 4:
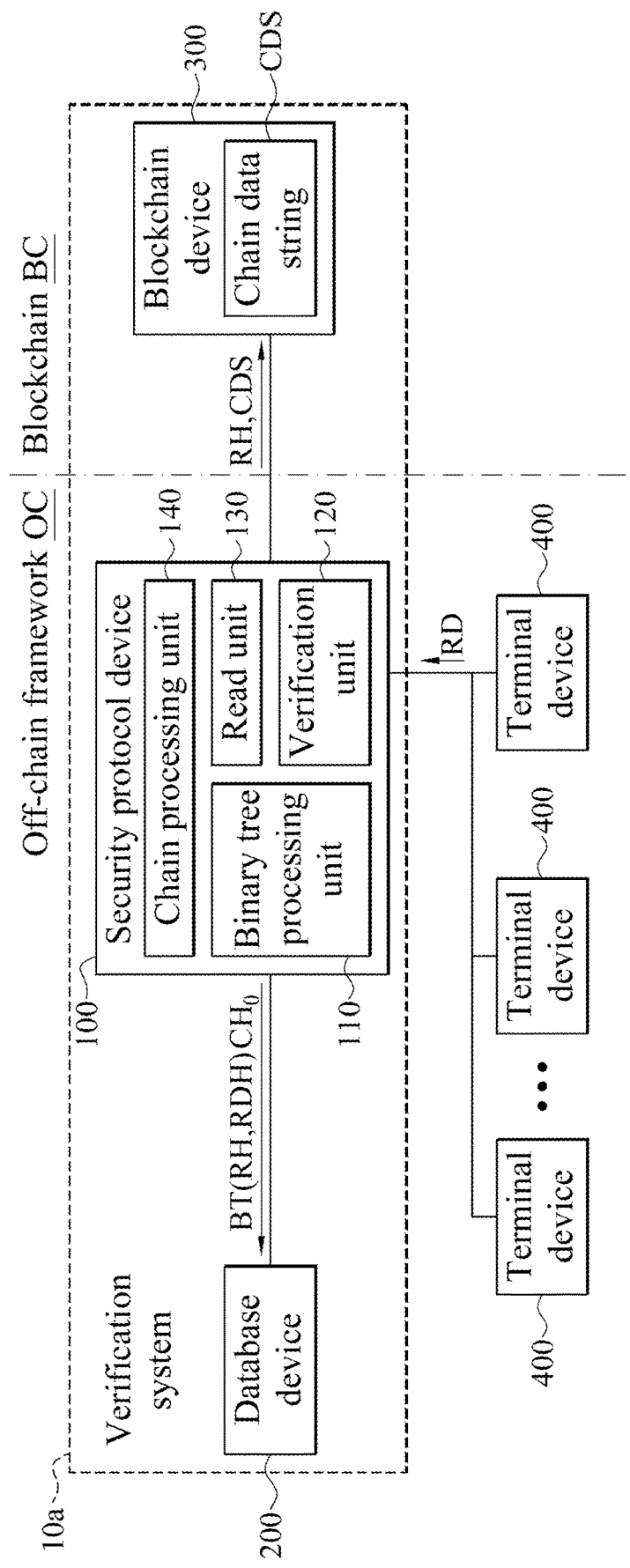
FIG. 4 is a schematic block diagram of a verification system according to another embodiment of the present invention.

Referring to FIG. 4, FIG. 4 is a schematic block diagram of a verification system 10a according to another embodiment of the present invention. The same or similar components, connection relationships, and functions of the verification systems 10 and 10a in FIG. 1 and FIG. 4 are not described again. One of the differences between the verification system 10a in FIG. 4 and the verification system 10 in FIG. 1 is that the security protocol device 100 of the verification system 10a in FIG. 4 further includes a chain processing unit 140, and the blockchain device 300 is not provided with a chain processing unit. After the binary tree processing unit 110 of the security protocol device 100 generates a plurality of binary trees BT, the chain processing unit 140 of the security protocol device 100 generates data sets DS according to a plurality of root hashes RH of the binary trees BT, and generates a chain data string CDS according to the aforementioned two formulas, and the security protocol device 100 transmits the chain data string CDS to the blockchain device 300. That is, the data transmitted by the security protocol device 100 to the blockchain BC is a data structure having the chain data string CDS.

Figure 5:
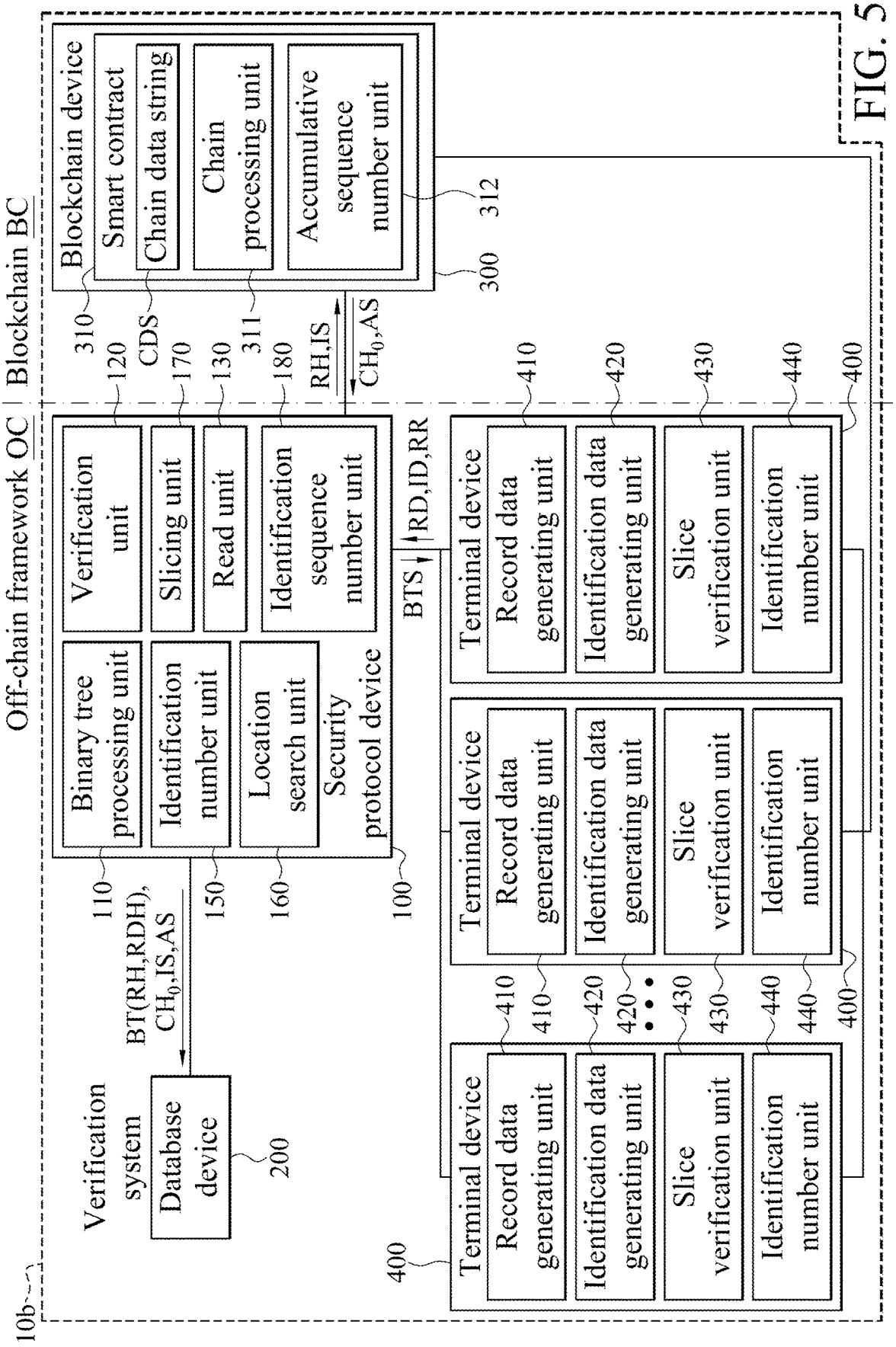
FIG. 5 is a schematic block diagram of a verification system according to yet another embodiment of the present invention.

Referring to FIG. 5, FIG. 5 is a schematic block diagram of a verification system 10b according to yet another embodiment of the present invention. The same or similar components, connection relationships, and functions of the verification systems 10 and 10b in FIG. 1 and FIG. 5 are not described again. One of the differences between the verification system 10b in FIG. 5 and the verification system 10 in FIG. 1 is that the verification system 10b in FIG. 5 includes a security protocol device 100, a database device 200, a blockchain device 300, and a plurality of terminal devices 400. The security protocol device 100 communicates with the blockchain device 300 located at the blockchain BC, and communicates with the database device 200 and the terminal devices 400 via the off-chain framework OC. The terminal devices 400 further communicate with the blockchain device 300. The security protocol device 100 includes a binary tree processing unit 110, a verification unit 120, a read unit 130, an identification number unit 150, a location search unit 160, a slicing unit 170, and an identification sequence number unit 180. The binary tree processing unit 110, the verification unit 120, the read unit 130, the identification number unit 150, the location search unit 160, the slicing unit 170, and the identification sequence number unit 180 are, for example but not limited to, functional modules formed by software/hardware to perform specific functions respectively, and the binary tree processing unit 110, the verification unit 120, the read unit 130, the identification number unit 150, the location search unit 160, the slicing unit 170, and the identification sequence number unit 180 may be independent modules or an integrated module.

As shown in FIG. 5, in this embodiment, the blockchain device 300 includes at least one smart contract 310, and the root hash RH transmitted by the security protocol device 100 to the blockchain device 300 is stored in the corresponding smart contract 310. In different embodiments, the blockchain device 300 can also include a program architecture or interface that is different from the smart contract, and the root hash RH can be stored in the blockchain device 300 corresponding to the different program architecture or interface.

As shown in FIG. 5, in this embodiment, each terminal device 400 includes a record data generating unit 410, an identification data generating unit 420, and a slice verification unit 430. The record data generating unit 410, the identification data generating unit 420, and the slice verification unit 430 are, for example but not limited to, functional modules formed by software/hardware to perform specific functions respectively. The record data generating unit 410, the identification data generating unit 420, and the slice verification unit 430 may be independent modules or an integrated module. The record data generating unit 410 is configured to generate the aforementioned record data RD. Moreover, when the record data generating unit 410 of each terminal device 400 generates the record data RD, the identification data generating unit 420 of each terminal device 400 also generates a plurality of identification data ID respectively corresponding to the record data RD, so that each of the record data RD has a corresponding identification data ID. The terminal device 400 transmits the record data RD and the corresponding identification data ID to the security protocol device 100 at the same time. In some embodiments, the terminal device 400 can integrate the record data RD and the corresponding identification data ID into integrated data and transmit the integrated data to the security protocol device 100. In some embodiments, the identification data ID is a plain code.

As shown in FIG. 5, in this embodiment, the security protocol device 100 receives the record data RD and the corresponding identification data ID, and the security protocol device 100 stores the hash values RDH of the record data RD to the corresponding leaf nodes LN according to the identification data ID. For example, after the security protocol device 100 receives the identification data ID, the identification number unit 150 of the security protocol device 100 generates a plurality of identification numbers IN respectively corresponding to the leaf nodes LN according to the identification data ID, and the security protocol device 100 stores the hash values RDH of the record data RD to the corresponding leaf nodes LN according to the identification numbers IN. In this case, each identification number IN is unique in any binary tree BT, and each of the identification numbers IN corresponds to the respective one of the leaf nodes LN in the binary tree BT. Therefore, the hash value RDH of each of the record data RD can be located at the respective one of the leaf nodes LN by using the corresponding identification number IN, which will be described in detail later.

In this embodiment, the identification number unit 150 of the security protocol device 100 extracts a plurality of predetermined bits from the hash value of the respective one of the identification data ID to generate the respective one of the identification numbers IN. Moreover, the number of the predetermined bits may be related to a height value H of the corresponding binary tree BT. When the binary tree BT has a height value H, the binary tree BT has $2^{(H-1)}$ leaf nodes LN. In order to enable the leaf nodes LN of the binary tree BT to have corresponding and exclusive unique identification numbers IN, the predetermined bits are at least H−1 bits extracted from the respective one of the hash values of the identification data ID. In this way, the arrangement of the H−1 bits will satisfy the number of the leaf nodes LN, so that the identification numbers IN corresponding to the leaf nodes LN are unique and not repeated. In this embodiment, the H−1 bits are, for example but not limited to, the first H−1 bits in the respective one of the hash values of the identification data ID. In other embodiments, the H−1 bits may be the last H−1 bits extracted from the respective one of the hash values of the identification data ID or H−1 bits in any location.

For example, the height value H of the binary tree BT of FIG. 2 is 5, and the binary tree BT has $2^{(5-1)}$ leaf nodes LN, that is, the binary tree BT has 16 leaf nodes LN. Assuming that identification data ID corresponding to a certain record datum RD is "E1534391", the identification number unit 150 hashes the identification data ID by using the SHA-256 hash function to generate a hash value "dbb9ed8b677468b4834d2f634a77ea1e6663431bf1ee7523041467ff8023fa64". Next, the identification number unit 150 extracts the first four bits "1101" of the binary bit sequence converted by the hash value, and converts "1101" to the decimal value "13", thereby generating the identification number IN as "13". The identification number unit 150 may sequentially set all the 16 leaf nodes LN of the binary tree BT to the leaf nodes LN numbered 1 to 16, and the hash value RDH of the record datum RD with the identification number IN of 13 is stored in the leaf node LN numbered 13. In some embodiments, different identification data ID may generate the same identification number IN, or different recording data RD may have the same identification data ID and generate the same identification number IN. In this case, the hash values RDH of the plurality of record data RD may correspond to the same identification number IN and be stored in the same leaf node LN. In some embodiments, each leaf node LN of the binary tree BT can store the hash values RDH of two or more record data RD, and the hash values RDH of the two or more record data RD corresponding to a certain leaf node LN are connected and then hashed to generate a hash value. The hash value corresponding to the two or more record data RD are stored in the leaf node LN.

As shown in FIG. 5, in this embodiment, the location search unit 160 of the security protocol device 100 can locate the hash values RDH of the record data RD by using the identification numbers IN. When a user needs to search or verify a hash value RDH corresponding to a certain record datum RD in a certain binary tree BT in the database device 200, the user can perform the above task by using the security protocol device 100. In this case, the location search unit 160 of the security protocol device 100 locates the hash value RDH of the record datum RD (i.e. the stored leaf node LN) by an identification number IN, and extracts the hash value RDH of the record datum RD directly from the leaf node LN of the binary tree BT corresponding to the identification number IN, so as to quickly locate and search for data. Moreover, to verify that a certain record datum RD does not exist, it can also be completed by using the identification number IN. The security protocol device 100 does not need to obtain all the hash values in the complete binary tree BT. The location search unit 160 of the security protocol device 100 can locate the hash value RDH of the record datum RD, i.e. the corresponding leaf node LN, by using an identification number IN corresponding to the record datum RD, and can directly confirm whether the hash value RDH of the record datum RD exists in the leaf node LN. If the leaf node LN does not have the hash value RDH of the record datum RD, it can be verified that the record datum RD does not exist. In this way, the network transmission requirements, operation amount, operation time, and operation costs of the entire verification task can be greatly reduced.

As mentioned above, in some embodiments, the identification data ID of different record data RD may generate the same identification number IN. In this case, a hash value RDH of a certain record datum RD may be located to two or more leaf nodes LN. If the record data RD needs to be verified, the security protocol device 100 can acquire and verify the hash values RDH in the two or more leaf nodes LN from the database device 200. In this embodiment, the probability of repeated identification numbers IN is relatively low. Even if a hash value RDH of a certain record datum RD is located to two or more leaf nodes LN, the number of the located leaf nodes LN is still less or far less than the number of all leaf nodes LN. The network transmission requirements, operation amount, operation time, and operation costs of the entire verification task still can be greatly reduced.

As shown in FIG. 5, in this embodiment, the terminal device 400 further includes an identification number unit 440. The identification number unit 440 of the terminal device 400 has the same function as the identification number unit 150 of the security protocol device 100. The identification number unit 440 also can generate identification numbers IN according to identification data ID of record data RD. The terminal device 400 can verify whether the security protocol device 100 acquires data from the correct leaf node LN by using the identification number unit 440. For example, if the terminal device 400 needs to verify a certain record datum RD, and identification data ID of the record data RD is "E1534391" (refer to the foregoing example), when the terminal device 400 transmits the verification request to the security protocol device 100, the location search unit 160 of the security protocol device 100 can locate a hash value RDH of the record datum RD by using an identification number IN corresponding to the record datum RD, finds that it is located in the leaf node LN numbered 13 of the binary tree BT in the database device 200, and returns the hash value RDH in the leaf node LN numbered 13 to the terminal device 400 for the terminal device 400 to perform verification. Similarly, the identification number unit 440 of the terminal device 400 also can generate an identification number IN according to the identification data ID "E1534391" of the record datum RD, and obtain that the hash value RDH of the record datum RD should be stored in the leaf node LN numbered 13 based on the identification number IN. Therefore, the terminal device 400 can confirm whether the hash value RDH of the record datum RD returned by the security protocol device 100 comes from the correct location (i.e. the leaf node LN numbered 13).

Figure 6:
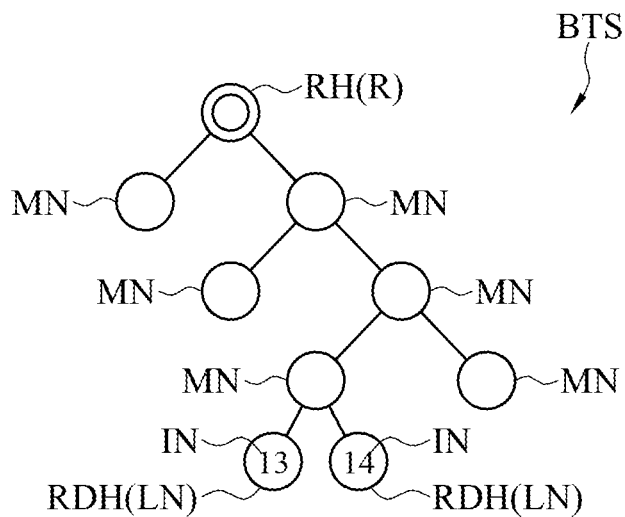
FIG. 6 is a schematic diagram of a slice of a binary tree according to an embodiment of the present invention.

Referring to FIG. 6, FIG. 6 is a schematic diagram of a slice BTS of a binary tree BT according to an embodiment of the present invention. As shown in FIG. 5 and FIG. 6, in this embodiment, when the security protocol device 100 transmits the root hash RH of the binary tree BT to the blockchain device 300, the slicing unit 170 of the security protocol device 100 automatically cuts the binary tree BT into a plurality of slices BTS and returns the slices BTS to the corresponding terminal devices 400, and the slice verification unit 430 of each terminal device 400 verifies the correctness of each slice BTS received. As shown in FIG. 2 and FIG. 6, in this embodiment, each slice BTS is Merkle proof formed by a root R, two corresponding leaf nodes LN, and necessary middle nodes MN of the binary tree BT. The hash values RDH of the record data RD stored in the set of leaf nodes LN can be obtained through the foregoing operation process to obtain the root hash RH located at the root R. A root hash RH of the slice BTS should be consistent with the root hash RH of the complete binary tree BT. For example, after a certain terminal device 400 transmits a certain record datum RD and identification data ID to the security protocol device 100, the security protocol device 100 stores a hash value RDH of the record datum RD in a certain leaf node LN of a certain binary tree BT and returns a slice BTS corresponding to the leaf node LN to the terminal device 400. The terminal device 400 compares whether the hash value RDH of the record datum RD in the leaf node LN of the slice BTS is consistent with the original hash values RDH of the original record data RD generated by the terminal device 400. If they are consistent, it indicates that the verification is correct. If they are inconsistent, it indicates that the verification is incorrect. If the verification is incorrect, the corresponding terminal device 400 can transmit a protest message to the blockchain device 300 for subsequent data correction or invalidation or other procedures.

In this embodiment, each terminal device 400 includes a blockchain chip. The blockchain chip is, for example but not limited to, an integrated circuit (IC) that can automatically transmit signals between the blockchain BC and the verification systems 10 and 10b. With the blockchain chip, the terminal device 400 can be designed to be lighter, thinner, and shorter, and the terminal device 400 can be more easily placed on any object or integrated into any electronic device. For example, the terminal device 400 can be set or integrated into a battery (such as a large battery pack for electric or hybrid buses or automobiles), an electric meter, an automobile headlight, an automobile body (such as a driving computer of an automobile networked through 5G), or a frame. The terminal device 400 automatically and continuously uploads the record data RD of each object. The record data RD are, for example but not limited to, hourly or daily (depending on the scheduled upload interval) historical use of the battery, the electric meter or the automobile headlight, or hourly or daily historical sensing data of sensor information (such as the engine, the odometer, the number of starts, etc.) of the automobile body, or the historical sensing data of the hourly or daily temperature and humidity changes sensed by the sensor on the frame, and the original data of the painter, etc. The security protocol device 100 can store the hash values RDH of the record data RD to the database device 200 via the off-chain framework OC, and upload the root hash RH to the blockchain device 300.

Based on the verification systems 10, 10a and 10b, in addition to rapid locating and searching of various data by the database device 200 via the off-chain framework OC, the non-repudiation of the data can also be achieved by verification of the blockchain BC. Moreover, based on the collocation application of the terminal device 400, the situation of the object can be guaranteed, and the value of the object can be improved. For example, used large battery packs used in long-haul vehicles can be transferred to short-haul vehicles after use to a certain degree, while the used large battery packs used in short-haul vehicles can be transferred to places such as fishing farms as backup power generation batteries after use to a certain degree. Each conversion can be performed through a platform such as a trading platform for used objects. The situation of the object can be verified by the verification systems 10, 10a, and 10b in each transaction, thereby improving the reliability of the object quality and the value of the object.

As shown in FIG. 5, in this embodiment, the smart contract 310 of the blockchain device 300 further includes a chain processing unit 311 and an accumulative sequence number unit 312. The identification sequence number unit 180 of the security protocol device 100 is configured to generate identification sequence numbers IS. The accumulative sequence number unit 312 of the blockchain device 300 is configured to generate accumulative sequence numbers AS. The chain processing unit 311 is configured to generate chain data strings CDS.

Figure 7:
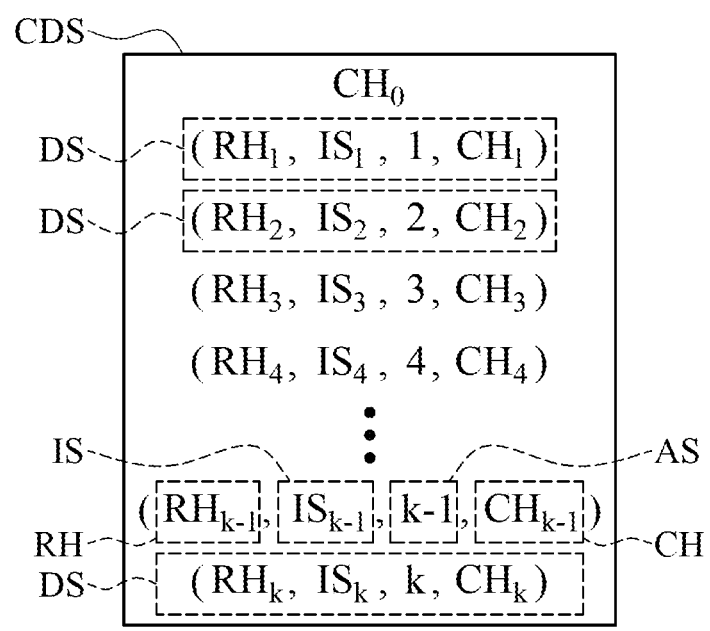
FIG. 7 is a schematic diagram of a chain data string according to another embodiment of the present invention.

Referring to FIG. 7, FIG. 7 is a schematic diagram of a chain data string CDS according to another embodiment of the present invention. As shown in FIG. 5 and FIG. 7, in this embodiment, each data set DS of the chain data string CDS includes a root hash RH, an identification sequence number IS, an accumulative sequence number AS, and a chain hash CH. The chain hash CH of each data set DS is related to the root hash RH, the identification sequence number IS, the accumulative sequence number AS, and the chain hash CH of the previous data set DS. The chain hash CH of the first data set DS is related to an initial chain hash $CH_0$. In some embodiments, each data set DS of the chain data string CDS includes a root hash RH, an identification sequence number IS, and a chain hash CH but does not include an accumulative sequence number AS, and the chain hash CH of each data set DS is related to the root hash RH, the identification sequence number IS, and the chain hash CH of the previous data set DS. In this embodiment, the chain hash CH of each data set DS is generated by hashing the previous data set DS, and the chain hash CH of the first data set DS is generated by hashing the initial chain hash $CH_0$.

As shown in FIG. 5 and FIG. 7, in this embodiment, the identification sequence number IS of each data set DS of the chain data string CDS respectively corresponds to each root hash RH. When the security protocol device 100 transmits the root hashes RH to the blockchain device 300, the security protocol device 100 further accordingly generates the identification sequence numbers IS and transmits the identification sequence numbers IS to the blockchain device 300. For example, the identification sequence number IS includes a time stamp related to the corresponding root hash RH. When the security protocol device 100 generates a certain root hash RH at a specific time point, the identification sequence number unit 180 generates an identification sequence number IS corresponding to the specific time point. The identification sequence number IS includes a time stamp corresponding to the specific time point. In other words, the root hashes RH generated at different time points definitely correspond to different identification sequence numbers IS. As time elapses, a time point corresponding to a time stamp of an identification sequence number IS of a root hash RH generated later is definitely later than a time point corresponding to a time stamp of an identification sequence number IS of an root hash RH generated earlier. Correspondingly, in the chain data string CDS, a time point corresponding to a time stamp of an identification sequence number IS of the latter data set DS is definitely later than a time point corresponding to a time stamp of an identification sequence number IS of the former data sets DS. Therefore, the non-modifiability of the data sets DS of the chain data string CDS can be enhanced, so that the data of the chain data string CDS is difficult to be tampered with.

As shown in FIG. 5 and FIG. 7, in this embodiment, the accumulative sequence number AS of each data set DS of the chain data string CDS respectively corresponds to each root hash RH, and the accumulative sequence number AS of each data set DS is an accumulative value of the accumulative sequence number of the previous data set DS. When the security protocol device 100 transmits the root hashes RH and the identification sequence numbers IS to the blockchain device 300, the accumulative sequence number unit 312 of the blockchain device 300 sequentially generates the accumulative sequence numbers AS corresponding to the root hashes RH and the identification sequence numbers IS. For example, when the blockchain device 300 receives the first root hash RH and the corresponding identification sequence number IS, the accumulative sequence number unit 312 generates an accumulative sequence number AS having a value of integer 1, and the chain processing unit 311 integrates the first data set DS, including the first root hash RH, the corresponding identification sequence number IS, the accumulative sequence number AS having a value of integer 1, and the corresponding chain hash CH. When the security protocol device 100 receives the second root hash RH and the corresponding identification sequence number IS, the accumulative sequence number unit 312 accumulates 1 to the previous accumulative sequence number AS to generate an accumulative sequence number AS having a value of integer 2, and the chain processing unit 311 integrates the second data set DS, including the second root hash RH, the corresponding identification sequence number IS, the accumulative sequence number AS having a value of integer 2, and the corresponding chain hash CH. In other words, the accumulative sequence number AS is continuously accumulated, and the accumulative sequence number AS of the data set DS generated later is definitely greater than the accumulative sequence number AS of the data set DS generated earlier. Moreover, the accumulative sequence number AS is generated by the blockchain device 300 on the blockchain, and has non-repudiation. Therefore, the non-modifiability of the data sets DS of the chain data string CDS can be enhanced, so that the data of the chain data string CDS is difficult to be tampered with.

In this embodiment, the chain processing unit 311 generates a plurality of data sets DS chained in a series manner in the chain data string CDS according to the following two formulas:

$$CH_i = hash(RH_{i-1}|IS_{i-1}|CH_{i-1}); \text{ and}$$

$$CH_1 = hash(CH_0).$$

$RH_{i-1}$ is root hash RH, $IS_{i-1}$ is identification sequence number IS, i−1 is accumulative sequence number AS, $CH_{i-1}$ is chain hash CH, and i is an integer from 2 to k.

As shown in FIG. 7, the first data set DS has a root hash RH of $RH_1$, an identification sequence number IS of $IS_1$, an accumulative sequence number AS of 1, and a chain hash CH of $CH_1$, and $CH_1$ is a hash value generated by hashing $CH_0$. The latter (arranged after the first data set DS) second data set DS has a root hash RH of $RH_2$, an identification sequence number IS of $IS_2$, an accumulative sequence number AS of 2, and a chain hash CH of $CH_2$, and $CH_2$ is the hash value generated by hashing the connected $RH_1$, $IS_1$, 1 and $CH_1$. The latter (arranged after the second data set DS) third data set DS has a root hash RH of $RH_3$, an identification sequence number IS of $IS_3$, an accumulative sequence number AS of 3, and a chain hash CH of $CH_3$, and $CH_3$ is the hash value generated by hashing the connected $RH_2$, $IS_2$, 2 and $CH_2$. The last data set DS has a root hash RH of $RH_k$, an identification sequence number IS of $IS_k$, a accumulative sequence number AS of k, and a chain hash CH of $CH_k$, and $CH_k$ is a hash value generated by hashing the connected $RH_{k-1}$, $IS_{k-1}$, k−1 and $CH_{k-1}$. The root hashes RH, the identification sequence numbers IS, the accumulative sequence numbers AS, and the chain hashes CH of the rest data sets DS are deduced by analogy. Moreover, these data sets DS chained in a series manner form the chain data string CDS.

As shown in FIG. 5 and FIG. 7, in this embodiment, the security protocol device 100 stores the binary tree BT and the initial chain hash $CH_0$ in the database device 200, and the security protocol device 100 also stores the identification sequence numbers IS and the accumulative sequence numbers AS of the root hashes RH corresponding to the binary trees BT (or the data sets DS corresponding to the chain data string CDS) in the database device 200. When the security protocol device 100 receives the read request RR, the read request RR is to read a plurality of root hashes RH, and the plurality of root hashes RH belongs to a plurality of data sets DS of a certain chain data string CDS, the read unit 130 reads the root hash RH of the latter data set DS of the chain data string CDS from the blockchain device 300, and reads one or more of the root hashes RH of the former data sets DS of the chain data string CDS from the database device 200, and the security protocol device 100 verifies the correctness of the former one or more root hashes RH of the database device 200 by using the chain hash CH of the latter data set DS of the blockchain device 300.

For example, when the security protocol device 100 receives the read request RR, and the read request RR is to read k root hashes RH from $RH_1$ to $RH_k$ of the chain data string CDS as in FIG. 7, the read unit 130 reads the root hash RH and the chain hash CH (i.e. $RH_k$ and $CH_k$) of the last data set DS of the data sets DS of the chain data string CDS from the blockchain device 300, and the read unit 130 reads the root hashes RH (from $RH_1$ to $RH_{k-1}$), the identification sequence numbers IS (from $IS_1$ to $IS_{k-1}$), and the accumulative sequence numbers AS (from 1 to k−1) of the former data sets from the database device 200. The verification unit 120 verifies the correctness of $RH_1$ to $RH_{k-1}$ of the former data sets DS of the database device 200 by using $RH_k$ of the last data set DS. The verification unit 120 can use the aforementioned two formulas and the initial chain hash $CH_0$, $RH_1$ to $RH_{k-1}$, IS to $IS_{k-1}$, and 1 to k−1 stored in the database device 200 to perform hashing and chaining operation to calculate $CH_k$, and compares the calculated $CH_k$ with $CH_k$ on the blockchain device 300. If the calculated $CH_k$ is consistent with $CH_k$ on the blockchain device 300, it represents that $RH_1$ to $RH_{k-1}$ stored in the database device 200 are consistent with $RH_1$ to $RH_{k-1}$ on the blockchain device 300. Because it is based on hashing operation, as long as any root hash RH in $RH_1$ to $RH_{k-1}$ stored in the database device 200 is inconsistent with the corresponding root hash RH in $RH_1$ to $RH_{k-1}$ on the blockchain device 300, the calculated $CH_k$ is different from $CH_k$ on the blockchain device 300.

In different embodiments, the components in the verification systems 10, 10a and 10b can be arbitrarily combined. For example, the verification system 10b may not include the terminal device 400; or the verification systems 10 and 10a may include the terminal device 400 similar to the verification system 10b, but are not limited thereto.

Figure 8:
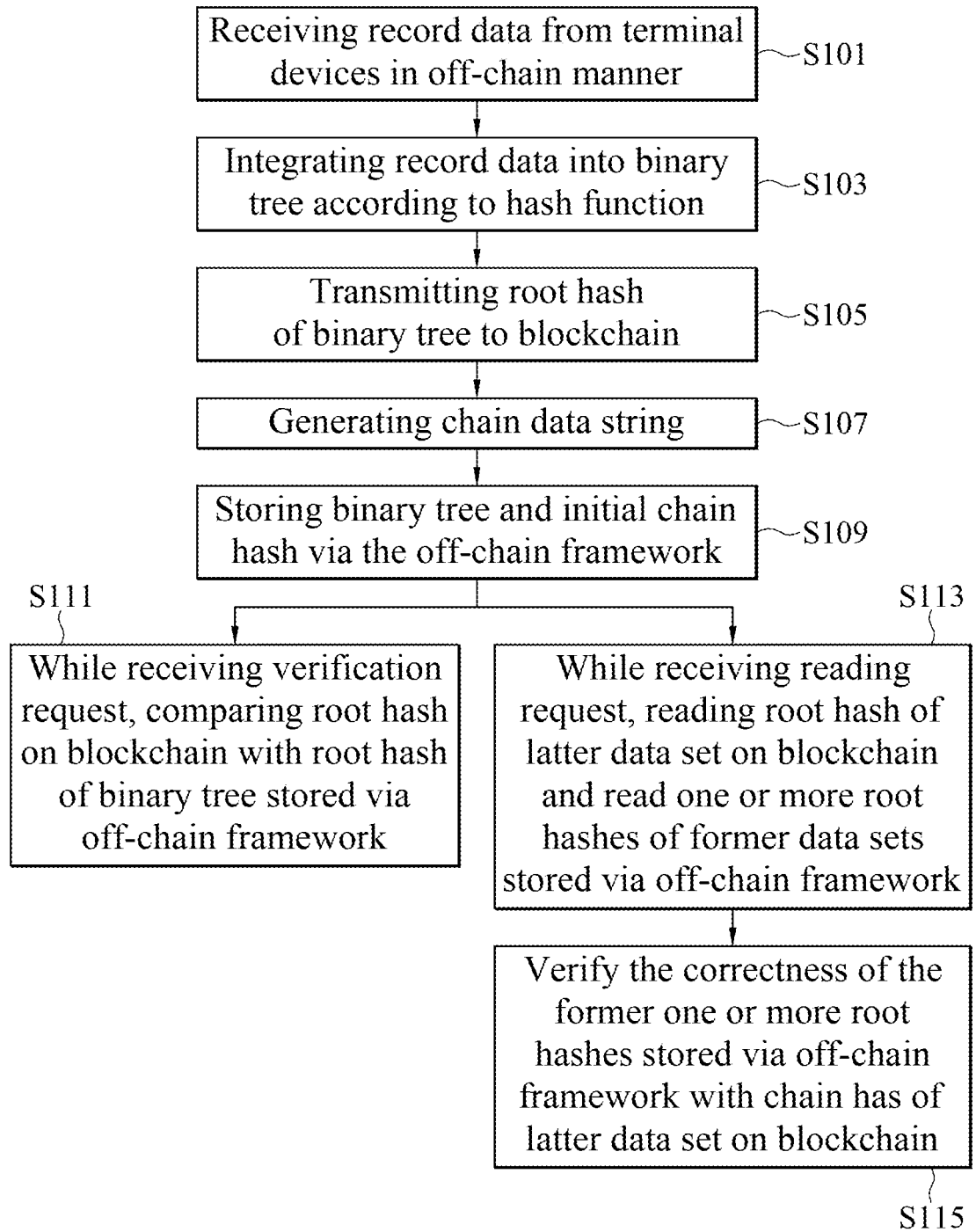
FIG. 8 is a flowchart of a verification method according to an embodiment of the present invention.

Referring to FIG. 8, FIG. 8 is a flowchart of a verification method according to an embodiment of the present invention. In this embodiment, the verification method can be implemented by the verification systems 10 and 10a shown in FIG. 1 or FIG. 4, but is not limited thereto. The verification method is suitable for cooperating with a blockchain BC. In step S101, the security protocol device 100 receives a plurality of record data RD from a plurality of terminal devices 400 in an off-chain manner, e.g. via an off-chain framework OC consisted of, for example, one or more off-chain devices and/or one or more off-chain channels not involved in the blockchain BC. In step S103, the security protocol device 100 integrates the record data RD into at least one binary tree BT according to a hash function, and the hash values RDH of the record data RD are respectively stored in the leaf nodes LN of the binary tree BT. In step S105, the security protocol device 100 transmits a root hash RH of the binary tree BT to the blockchain BC, and the blockchain device 300 stores the root hashes RH. In step S107, the blockchain device 300 or the security protocol device 100 generates a chain data string CDS according to the aforementioned formulas.

In step S109, the security protocol device 100 stores the binary tree BT and the initial chain hash $CH_0$ via the off-chain framework OC, that is, the security protocol device 100 stores the complete binary tree BT and the initial chain hash $CH_0$ in the database device 200 via the off-chain framework OC. In different embodiments, the initial chain hash $CH_0$ may not be stored in the database device 200. The security protocol device 100 can read the initial chain hash $CH_0$ from the blockchain device 300 when needed.

In step S111, when the security protocol device 100 receives a verification request, the security protocol device 100 compares the root hash RH in the blockchain device 300 located on the blockchain BC with the root hash RH of the binary tree BT stored in the database device 200 via the off-chain framework OC, so as to verify the correctness of the binary tree BT stored via the off-chain framework OC. In step S113, when the security protocol device 100 receives the read request RR, and the read request RR requests to read a plurality of root hashes RH of a plurality of data sets DS in the chain data string CDS, the security protocol device 100 reads the root hash RH of the latter data set DS on the blockchain BC and reads one or more of the root hashes RH of the former data sets DS stored via the off-chain framework OC. In step S115, the security protocol device 100 verifies the correctness of the former one or more root hashes RH stored via the off-chain framework OC by using the chain hash CH of the latter data set DS on the blockchain BC.

Figure 9A:
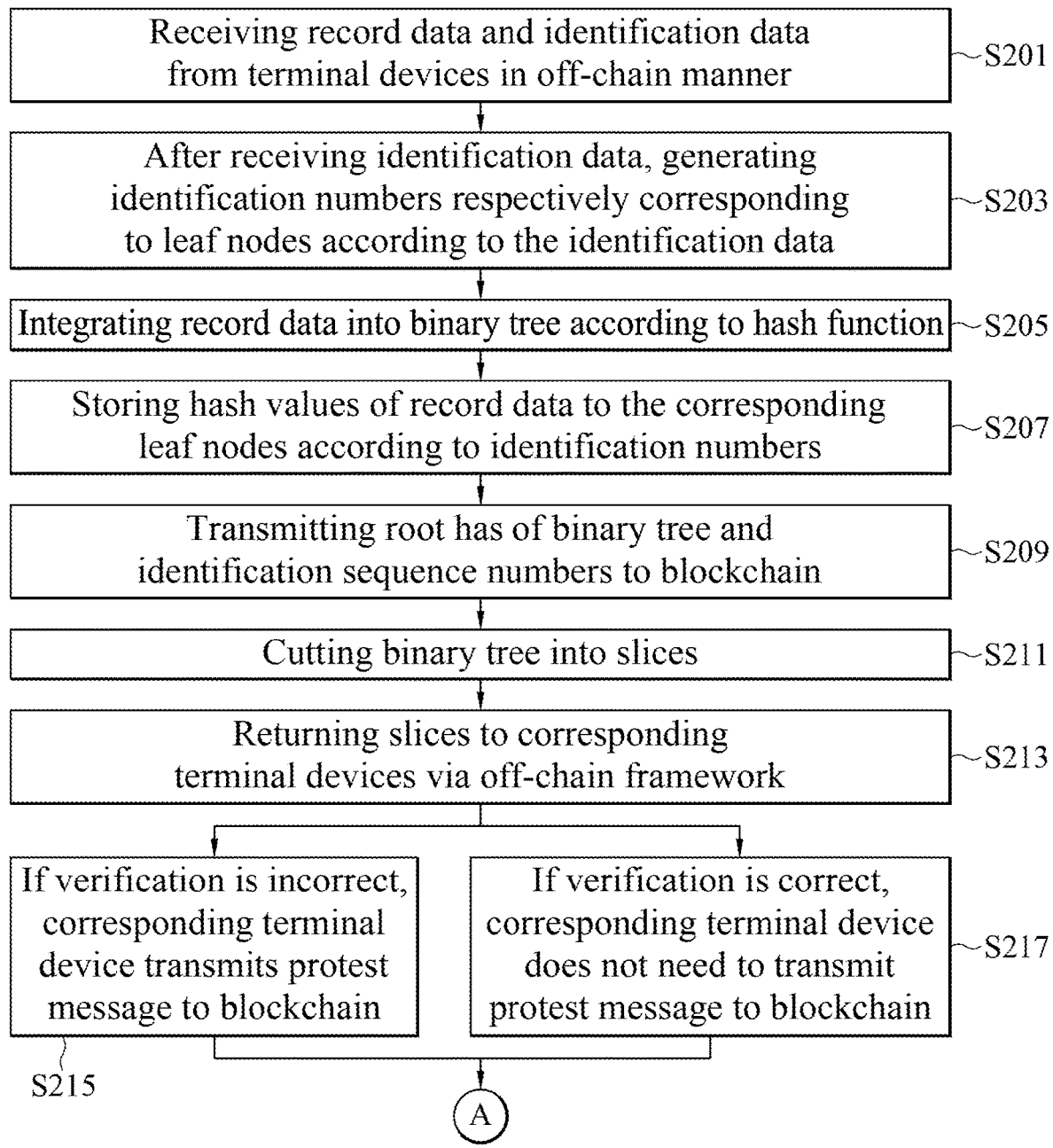
FIGS. 9a and 9b are a flowchart of a verification method according to another embodiment of the present invention.
Figure 9B:
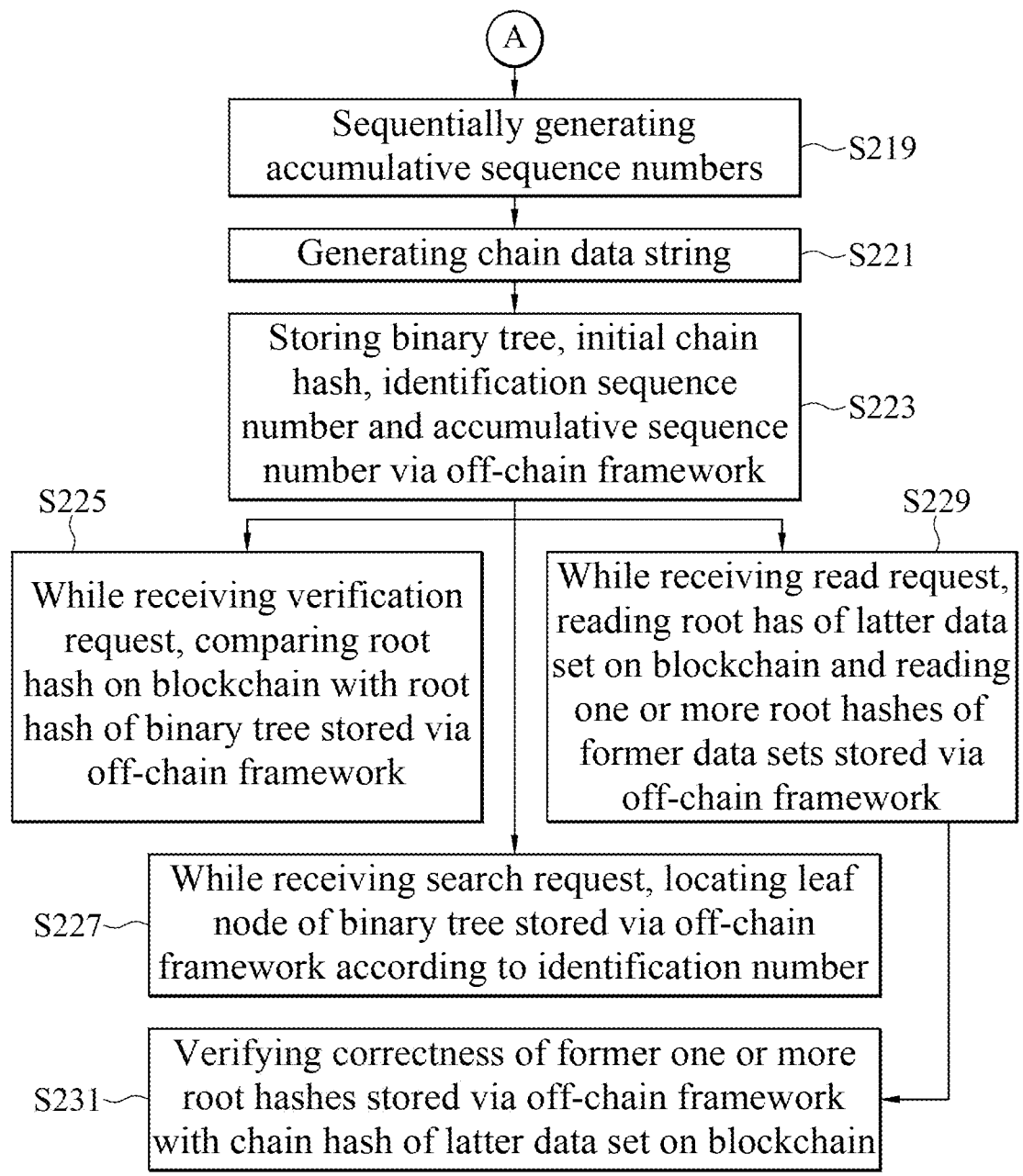

Referring to FIGS. 9a and 9b, FIGS. 9a and 9b are a flowchart of a verification method according to another embodiment of the present invention. In this embodiment, the verification method can be implemented by the verification systems 10b shown in FIG. 5, but is not limited thereto. In step S201, the security protocol device 100 receives a plurality of record data RD and a plurality of identification data ID from a plurality of terminal devices 400 in an off-chain manner, e.g. via an off-chain framework OC consisted of, for example, one or more off-chain devices and/or one or more off-chain channels not involved in the blockchain BC, and the identification data ID respectively correspond to the record data RD. In step S203, after the security protocol device 100 receives the identification data ID, the security protocol device 100 generates a plurality of identification numbers IN respectively corresponding to leaf nodes LN according to the identification data ID, and each leaf node LN of the binary tree BT corresponds to a unique identification number IN. For example, the security protocol device 100 extracts a plurality of predetermined bits from the hash value of each identification datum ID to generate each identification number IN. If the binary tree BT has a height value H, the predetermined bits are the first H−1 bits of the hash value of each identification datum ID. In step S205, the security protocol device 100 integrates the record data RD into at least one binary tree BT according to a hash function. In step S207, the security protocol device 100 stores the hash values RDH of the record data RD to the corresponding leaf nodes LN according to the identification numbers IN. In step S209, the security protocol device 100 transmits a root hash RH of the binary tree BT and the corresponding identification sequence numbers IS to a blockchain BC, and the blockchain device 300 stores the root hashes RH and the corresponding identification sequence numbers IS. In step S211, the security protocol device 100 cuts the binary tree BT into a plurality of slices BTS. In step S213, the security protocol device 100 returns the slices BTS to the corresponding terminal devices 400 via the off-chain framework OC.

Next, each terminal device 400 verifies the correctness of each slice BTS received. In step S215, when the slice BTS is verified to be incorrect, the corresponding terminal device 400 transmits a protest message to the blockchain BC. In step S217, when the slice BTS is verified to be correct, the terminal device 400 does not need to transmit a protest message to the blockchain BC.

In step S219, the blockchain device 300 of the blockchain BC sequentially generates the accumulative sequence numbers AS corresponding to the root hashes RH and the identification sequence numbers IS. In step S221, the blockchain device 300 of the blockchain BC generates a chain data string CDS according to the root hash RH, the identification sequence number IS, and the accumulative sequence number AS. In step S223, the security protocol device 100 stores the binary tree BT, the initial chain hash CH0, the identification sequence number IS, and the accumulative sequence number AS in the database device 200 via the off-chain framework OC.

In step S225, when the security protocol device 100 receives a verification request, the security protocol device 100 compares the root hash RH in the blockchain device 300 located on the blockchain BC with the root hash RH of the binary tree BT stored in the database device 200 via the off-chain framework OC, so as to verify the correctness of the binary tree BT stored via the off-chain framework OC. In step S227, when the security protocol device 100 receives a search request, and the search request is directed at a certain record datum RD, the security protocol device 100 locates the leaf node LN of the binary tree BT stored via the off-chain framework OC according to an identification number IN corresponding to the record datum RD, so as to search the leaf node LN corresponding to the identification number IN and acquire a hash value RDH of the record datum RD from the leaf node LN, or verify that a hash value RDH of the record datum RD does not exist in the leaf node LN.

In step S229, when the security protocol device 100 receives the read request RR, and the read request RR requests to read a plurality of root hashes RH of a plurality of data sets DS in the chain data string CDS, the security protocol device 100 reads the root hash RH of the latter data set DS on the blockchain BC and reads one or more of the root hashes RH of the former data sets DS stored via the off-chain framework OC. In step S231, the security protocol device 100 verifies the correctness of the former one or more root hashes RH stored via the off-chain framework OC by using the chain hash CH of the latter data set DS on the blockchain BC.

By means of the verification systems 10, 10a and 10b, when a large number of data need to be read, a relatively large number of data can be read via the off-chain framework OC under the architecture of the chain data string CDS, and only a relatively small number of data need to be read by the blockchain BC. The data of the blockchain BC is adopted to verify the data via the off-chain framework OC, so that efficiency and credibility can be considered simultaneously. For example, in a company, the hash value of the daily commute record of each employee is correspondingly stored in each leaf node LN in a binary tree BT, and each binary tree BT is the one-day commute record of all employees of the company. Then, all employees' annual commute records will accumulate into hundreds of data, that is, hundreds of binary trees BT, and these data will be stored and used based on the verification systems 10, 10a or 10b. If one day, the company's internal control department needs to call up the commute record of an employee in several years, the verification systems 10, 10a or 10b do not need to perform a large number of readings on the blockchain BC, and only need to read the root hash RH and the chain hash CH of the last data set DS of each chain data string CDS on the blockchain BC. The rest root hash RH of each chain data string CDS can be read by the database device 200 via the off-chain framework OC. The correctness of the rest root hashes RH of the database device 200 can be verified by the chain hash CH of the last data set DS on the blockchain BC. In this way, the network transmission requirements and operation loads of the blockchain can be greatly reduced, and the correctness of the off-chain OC data can also be verified.

In summary, the conventional blockchain architecture transfers all data to the blockchain and then verifies the data through blockchain miners, which will consume a large number of blockchain operation resources. According to the verification system and method of the embodiments of the present invention, under the premise of maintaining the credibility (non-repudiation) of the data, most of the data can be set in an off-chain database device, and the correctness of the binary tree can be verified by comparing the root hash of the binary tree of the off-chain database device with the corresponding root hash of the blockchain by the security protocol device. Therefore, the main operations are converted to be performed in the off-chain manner, greatly reducing the loads on the blockchain. In addition, the security protocol device can locate the record data according to the identification number, thereby quickly searching for the leaf nodes in which the hash values of the record data in the database device are stored, and quickly verifying whether the record data exist or not. By means of the verification system and method of the embodiments of the present invention, the total operation amount, operation time, and operation costs of the system can be reduced. Moreover, the terminal device with the blockchain chip can be set or integrated into various objects, which is more simple and convenient in practical application, and can improve the reliability of the object quality and the value of the object.

In addition, by means of the chain data string of the verification system and method of the embodiment of the present invention, when a large number of root hashes of the binary tree need to be read, the root hashes can be read by the off-chain database device, and the correctness of the root hashes read in the off-chain manner is verified by the chain hash of the latter data set of the chain data string on the blockchain. Therefore, under the premise of maintaining the credibility of the data, the network transmission requirements and operation loads of the blockchain are alleviated.

While the present invention has been described by way of example and in terms of the preferred embodiments, it is to be understood that the present invention needs not be limited to the disclosed embodiments. For anyone skilled in the art, various modifications and improvements within the spirit of the present invention are covered under the scope of the present invention. The covered scope of the present invention is based on the appended claims.

What is claimed is:

1. A method for verifying chaining data on a blockchain performed by a security protocol device, the verification method comprising:

storing a plurality of binary trees in a database in an off-chain manner, wherein each of the binary trees comprises a root and a plurality of leaf nodes, and each of the leaf nodes stores a root hash associated with each of the plurality of binary trees and wherein a set of root hashes of the plurality of binary trees is stored in the database;

receiving, by the security protocol device, a read request from a terminal device;

reading, in response to the read request, the set of root hashes stored in the database and a specific root hash from a blockchain device;

performing a hashing with a sequential chaining operation on (i) each of the set of root hashes read from the database and (ii) a corresponding chain hash of a set of respective chain hashes to determine a calculated root hash; and comparing by the security protocol device the specific root hash stored at the blockchain device with the calculated root hash from the performed hashing and chaining operation to verify the correctness of the set of root hashes in the database.

2. The verification method according to claim 1, wherein the hashing and chaining operation comprises:

generating a plurality of off-chain data sets chained in a series manner, wherein each of the off-chain data sets comprises a respective one of the root hashes read from the data base and a corresponding first chain hash, the first chain hash of a first one of the off-chain data sets is generated by hashing an initial chain hash, the first chain hash of each off-chain data set after the first off-chain data set is generated by hashing a previous one of the off-chain data sets, and the root hash of a last one of the off-chain data sets is the calculated root hash.

3. The verification method according to claim 2, further comprising:

receiving a plurality of record data values; and integrating the record data values into the binary trees according to a hash function, wherein hash values of the record data values are respectively stored in the leaf nodes; and storing the root hashes of the binary trees in the blockchain.

4. The verification method according to claim 3, wherein the root hashes stored in the blockchain are included in a chain data string, the chain data string comprises a plurality of data sets chained in a series manner, each of the data sets comprises a respective one of the root hashes stored in the blockchain and a corresponding second chain hash, the second chain hash of a first one of the data sets is generated by hashing the initial chain hash, the second chain hash of each data set after the first data set is generated by hashing a previous one of the data sets, and the root hash of a last one of the data sets is the specific root hash.

5. The verification method according to claim 4, further comprising:

transmitting a plurality of identification sequence numbers to the blockchain, so that the data sets comprise the identification sequence numbers, respectively;

wherein each of the identification sequence numbers comprises a time stamp.

6. The verification method according to claim 2, wherein each of the off-chain data sets further comprises an identification sequence number and an accumulative sequence number, each of the accumulative sequence numbers respectively corresponds to the root hash of each of the off-chain data sets, the accumulative sequence number of each of the off-chain data sets is an accumulative value derived from the accumulative sequence number of a previous one of the off-chain data sets, the first chain hash of each of the off-chain data sets is generated by hashing the root hash, the identification sequence number, the accumulative sequence number, and the first chain hash of the previous off-chain data set.

7. A security protocol device for verifying chaining data on a blockchain comprising:

a memory; and a hardware processor configured to the memory, the hardware processor being configured to:

store a plurality of binary trees in a database in an off-chain manner, wherein each of the binary trees comprises a root and a plurality of leaf nodes, and each of the leaf nodes stores a root hash associated with each of the plurality of binary trees and wherein a set of root hashes of the plurality of binary trees is stored in the database;

receive, by the security protocol device, a read request from a terminal device;

read, in response to the read request, the set of root hashes stored in the database and a specific root hash from a blockchain device;

performing a hashing with a sequential chaining operation on (i) each of the set of root hashes read from the database and (ii) a corresponding chain hash of a set of respective chain hashes to determine a calculated root hash; and compare by the security protocol device the specific root has stored at the blockchain device with the calculated root hash from the performed hashing and chaining operation to verify the correctness of the set of root hashes stored in the database.

8. The security protocol device according to claim 7, wherein the processor in further configured to:

generate a plurality of off-chain data sets chained in a series manner, wherein each of the off-chain data sets comprises a respective one of the root hashes read from the data base and a corresponding first chain hash, the first chain hash of a first one of the off-chain data sets is generated by hashing an initial chain hash, the first chain hash of each off-chain data set after the first off-chain data set is generated by hashing a previous one of the off-chain data sets, and the root hash of a last one of the off-chain data sets is the calculated root hash.

9. The security protocol device according to claim 8, wherein the processor in further configured to:

receive a plurality of record data values;

integrate the record data values into the binary trees according to a hash function, wherein hash values of the record data values are respectively stored in the leaf nodes; and store the root hashes of the binary trees in the blockchain.

10. The security protocol device according to claim 9, wherein the root hashes stored in the blockchain are included in a chain data string, the chain data string comprises a plurality of data sets chained in a series manner, each of the data sets comprises a respective one of the root hashes stored in the blockchain and a corresponding second chain hash, the second chain hash of a first one of the data sets is generated by hashing the initial chain hash, the second chain hash of each data set after the first data set is generated by hashing a previous one of the data sets, and the root hash of a last one of the data sets is the specific root hash.

11. The security protocol device according to claim 10, wherein the processor in further configured to:

transmit a plurality of identification sequence numbers to the blockchain, so that the data sets comprise the identification sequence numbers, respectively;

wherein each of the identification sequence numbers comprises a time stamp.

12. The verification method according to claim 7, wherein each of the off-chain data sets further comprises an identification sequence number and an accumulative sequence number, each of the accumulative sequence numbers respectively corresponds to the root hash of each of the off-chain data sets, the accumulative sequence number of each of the off-chain data sets is an accumulative value derived from the accumulative sequence number of a previous one of the off-chain data sets, the first chain hash of each of the data sets is generated by hashing the root hash, the identification sequence number, the accumulative sequence number, and the first chain hash of the previous off-chain data set.

13. A method for verifying chaining data on a blockchain performed by a blockchain device, the method comprising:

receiving, by the blockchain device, a plurality of root hashes corresponding to a plurality of binary trees from a security protocol device, wherein the plurality of binary trees are stored in a database in an off-chain manner;

generating a chain data string according to the plurality of root hashes, wherein the chain data string comprises a plurality of data sets chained in a series manner, each of the plurality of data sets comprises a respective one of the plurality of root hashes and a corresponding chain hash, the chain hash of a first one of the plurality of data sets is generated by hashing an initial chain hash, and the chain hash of each data set after the first data set is generated by hashing a previous one of the plurality of data sets; and transmitting a specific root hash to the security protocol device, wherein the specific root hash is provided to the security protocol device for verifying the correctness of the plurality of binary trees stored in the database;

wherein the specific root hash is the root hash of a last one of the plurality of data sets in a data section of the chain data string, and the data section corresponds to a data reading range indicated by a read request, from a terminal device, provided to the security protocol device.

14. The method according to claim 13, wherein each of the data set further comprises an identification sequence number, each of the identification sequence numbers respectively corresponds to the root hash of each of the data sets, the chain hash of each of the data sets is related to the root hash, the identification sequence number, and the chain hash of a previous one of the data sets.

15. The method according to claim 13, further comprising:

receiving the identification sequence numbers from the security protocol device.

16. The method according to claim 15, wherein each of the identification sequence numbers comprises a time stamp.

17. The method according to claim 13, wherein each of the data set further comprises an accumulative sequence number, each of the accumulative sequence numbers respectively corresponds to the root hash of each of the data sets, the accumulative sequence number of each of the data sets is an accumulative value derived from the accumulative sequence number of a previous one of the data sets, and the chain hash of each of the data sets is related to the root hash, the identification sequence number, the accumulative sequence number, and the chain hash of the previous data set.

18. A blockchain device for chaining data on a blockchain comprising:

a memory; and a hardware processor configured to the memory, the hardware processor being configured to:

receive, by the blockchain device, a plurality of root hashes corresponding to a plurality of binary trees from a security protocol device, wherein the plurality of binary trees are stored in a database in an off-chain manner;

generate a chain data string according to the plurality of root hashes, wherein the chain data string comprises a plurality of data sets chained in a series manner, each of the plurality of data sets comprises a respective one of the plurality of root hashes and a corresponding chain hash, and the chain hash of a first one of the data sets is generated by hashing an initial chain hash, the chain hash of each data set after the first data set is generated by hashing a previous one of plurality of the data sets;

transmit a specific root hash to the security protocol device, wherein the specific root hash is provided to the security protocol device for verifying the correctness of the plurality of binary trees stored in the database;

wherein the specific root hash is the root hash of a last one of the data sets in a data section of the chain data string, and the data section corresponds to a data reading range indicated by a read request, from a terminal device, provided to the security protocol device.

19. The blockchain device according to claim 18, wherein each of the data set further comprises an identification sequence number, each of the identification sequence numbers respectively corresponds to the root hash of each of the data sets, the chain hash of each of the data sets is related to the root hash, the identification sequence number, and the chain hash of a previous one of the data sets.

20. The blockchain device according to claim 19, wherein each of the data set further comprises an accumulative sequence number, each of the accumulative sequence numbers respectively corresponds to the root hash of each of the data sets, the accumulative sequence number of each of the data sets is an accumulative value derived from the accumulative sequence number of a previous one of the data sets, and the chain hash of each of the data sets is related to the root hash, the identification sequence number, the accumulative sequence number, and the chain hash of the previous data set.

* * * * *